United States Patent
Kurtz

[19]

[11] Patent Number: 6,123,224
[45] Date of Patent: Sep. 26, 2000

[54] BULK SOLIDS TRANSPORT SYSTEM AND METHOD

[76] Inventor: Richard Kurtz, 6662 Welch Ct., Arvada, Colo. 80004

[21] Appl. No.: 09/104,053

[22] Filed: Jun. 24, 1998

[51] Int. Cl.[7] .................................................. B67B 7/00
[52] U.S. Cl. .............................. 222/1; 222/361; 141/279; 141/284; 198/750.7
[58] Field of Search ................................ 222/1, 361, 527; 198/750.7; 141/279, 284, 348, 382

[56] References Cited

U.S. PATENT DOCUMENTS

| | | |
|---|---|---|
| 1,667,339 | 4/1928 | Zimmerman . |
| 2,533,331 | 12/1950 | Skinner . |
| 3,342,307 | 9/1967 | Leach . |
| 3,460,722 | 8/1969 | Jung . |
| 4,395,968 | 8/1983 | Wahnscaff et al. . |
| 4,505,380 | 3/1985 | McLemore et al. .................. 198/750.7 |
| 4,899,669 | 2/1990 | Dumbaugh et al. . |
| 5,143,126 | 9/1992 | Boesch et al. . |
| 5,147,031 | 9/1992 | Carpenter ............................. 198/750.7 |
| 5,653,586 | 8/1997 | Arai et al. . |
| 5,860,508 | 1/1999 | Foster ............................... 198/750.7 X |

*Primary Examiner*—Gregory L. Huson
*Attorney, Agent, or Firm*—Ramon L. Pizarro; Edwin H. Crabtree

[57] ABSTRACT

A system for conveying particulates which includes a trough adapted for receiving and holding the particulates being conveyed and a fluid operated, piston and cylinder mechanism for oscillating the trough. The mechanism allowing oscillation by first increasing rate and or fluid pressure to the cylinder, the piston being connected to the trough so that the fluid delivered to the piston at the gradually increasing rate drives the piston to a desired speed. A stop is also provided rapidly decelerating the trough, so that particulates carried in the trough may be accelerated to a desired speed by the piston and then rapidly decelerated with the stop, so that the momentum gained by the particulates received in the trough as the trough is accelerated allows the particulates to move relative to the trough when the trough is rapidly decelerated.

20 Claims, 5 Drawing Sheets

BULK SOLIDS TRANSPORT SYSTEM AND METHOD

BACKGROUND OF THE INVENTION (a) Field of the Invention

This invention generally relates to a system and method for delivering bulk materials to an area where they will be processed More particularly, but without limitation to, a pneumatically activated delivery system for delivering particulate materials to a hopper or the like, and to a hopper and melt pot system that uses a peel-away melt pot cover together with a feed hopper that is positionable directly over the opening exposed by the peel-away melting pot cover.

(b) Discussion of Known Art

The need to deliver raw materials in bulk to a desired location for processing has produced many devices which address problems with contamination, reliability, maintainability, simplicity, and versatility. These problems are of particular importance in the adhesives industry, where granulated "chips" or particulates of solid glue material are delivered by a conveying system to a melting pot. In these systems, the chips are typically stored in a bulk storage container such as a tote bin or a "super sack" prior to delivery to the point of use.

The delivery of the unmelted glue pieces from the bulk storage container to the melting pot has typically been accomplished by the use of pneumatic conveying systems of one type or another. These systems have a number of disadvantages. Some of the most salient disadvantages include the following:

1) There is a limit to the size of the "chips" that can be transported. The upper limit is generally regarded as being pellets of about ⅜" in diameter. Bulk hot melt glues come in a variety of sizes and shapes, including sticks of up to approximately 1"×3"×¼". Thus, known systems lack the versatility to carry many of the available bulk products. It is important to note that glue sticks, as well as pellets or other bulk forms of solid glue will be referred to herein as "particles."

2) Existing systems give significant opportunity for contamination or oxidation of the material being delivered. The use of air (or vacuum) to transport the product means that the product must be either dropped out in a cyclone type separator, or as is done in most cases, the air is exhausted into the glue melting pot where the combination of turbulence and oxygen in the air causes accelerated oxidation and charring of the glue. This, in turn, can subsequently plug application devices and cause down time on the production line.

3) Air transport systems, if not filtered adequately, can introduce contaminants into the glue.

4) Many bulk meltable glues are shipped with a "dust" coating which improves the handling characteristics of the bulk material by preventing the chips from adhering to one another. Thus, the transporting air or gas stream also picks up this dust coating on the hot melt glue. This dust must then be filtered out when the air is exhausted, creating a maintenance problem as well as possibly causing a troublesome build up of dust on equipment and processes.

5) Moving parts used in known systems can be easily fouled by vapors found in the working environment. The methods currently in use for actually placing the charge of unmelted glue particles or pieces into the melt pot involve placing equipment directly above the melt pot. Melted glue and the melt pot at operating temperature gives off a significant amount of vapors. These vapors condense on the equipment and result in a very sticky film that causes problems in operation after a short period of time.

6) The advent of reactive types of hot melt adhesives has introduced an increased sensitivity to the presence of oxidizing agents. For reasons outlined above, air or vacuum transport systems exacerbate this problem and current systems offer no means of preventing air from contacting the melted glue.

There remains a need for a bulk materials transport system which can transport a wide variety of hot melt glue sticks to a desired location for processing.

Furthermore, there remains a need for bulk solid glue particulate transport system which can prevent contamination or oxidation of the material being delivered.

Still further, there remains a need for a bulk materials transport system that does not require the use of air or other gases for transport, and thus prevents the accumulation and spreading of airborne dust.

Still further there remains a need for a system which uses few moving parts or parts which are not easily fouled by vapors found in the working environment.

There remains a need for a system that can deliver predetermined amounts of meltable glue to a melting pot while allowing the use of the delivery system with a means of preventing air from contacting the melted glue within the melting pot.

SUMMARY

It has been discovered that the above needs can be met with a system having an oscillating conveying system with a pneumatically activated oscillating means. The disclosed pneumatically activated oscillating means includes a piston that is driven by means of gradually increasing gas pressure. This gradually increasing gas pressure will preferably be provided by several one way valves or constrictions that have been calibrated to allow flow of the driving gas at graduated or increasing pressure. Once the piston travels the desired distance it is then stopped and returned to its starting position.

It will be appreciated that the oscillating motion imparted by the described system will be a result of linear actuation from the piston. Thus, the force delivered by the piston will be along a line. This is a substantial departure from known systems which typically use rotating cranks and linkages to convert rotational energy to energy that is to be delivered along a line. The disclosed invention does not introduce out of plane forces that are inherent in rotating crank mechanisms. By eliminating the out of plane forces one greatly reduces the need for structure that reacts to these forces.

The oscillating linear motion generated with the instant invention is used to drive a conveying trough or tube. The conveying trough or tube will preferably include a substantially smooth bottom. The smoothness of the bottom will permit particles to be conveyed over the trough by a sliding in waves. The wave motion will be generated by the gradual acceleration of the particles by means of the trough, followed by a rapid deceleration of the trough, which allows the particles to advance over the trough due to kinetic energy imparted on to the particles during the gradual acceleration stage.

As the particles advance over the trough, the particles will encounter openings which allow the particles to fall out of the through at desired locations. From the trough, the particles will preferably fall into a hopper or measuring container. In a preferred embodiment of the invention the brim or entrance of the measuring container is flush with the trough. This arrangement allows the particles traveling along the trough to continue traveling over the entrance of the measuring container once the measuring container has been filled with particles. It has been discovered that this arrangement allows the placement of several successive outlets for measuring containers along the trough, and thus allowing the system to fill or feed several measuring containers along the trough.

The measuring container will preferably include a hopper section that is next to the entrance of the measuring container. From the hopper will extend a flexible chute or tube that is used to deliver the glue particles to the melting pot. The discharge of the particles from the hopper, through the chute, and into the melting pot will preferably be controlled by a choke valve or other valving means placed at a distance from the exit of the chute. In a highly preferred embodiment, a choke valve is placed near the discharge point of the hopper. Once the particles leave the hopper, they travel down the flexible chute and into the entrance of the melting pot.

According to another aspect of the invention, it has been discovered that by using a peel away cover over the entrance of the melting pot one can enhance the reliability and delivery of material to the melting pot, while simplifying the mechanisms of the system. Furthermore, it has been discovered that by providing a peel away cover one greatly enhances the delivery of particles of glue material while minimizing the exposure of the melted glue to surrounding air.

Still further, it has been discovered that the use of a peel away cover together with the flexible chute produces new, synergistic, results when using the system to deliver particles to the melting pot under a blanket of inert gas to prevent exposure of the melt to oxygen in the surrounding air. The close placement of the disclosed flexible chute and peel away cover allows the chute to follow the cover as it is peeled away, and thus partially closing the opening to the melting pot. This closing permits the sealing off the melt and the particles being delivered in a small amount of inert blanketing gas (which must be heavier than air). The use of a blanketing gas means that virtually no air comes in contact with the molten material and only small amounts of additional gas are required to "top off" the pot after each charge.

Thus it will be appreciated that the instant invention solves problems left unanswered by the prior art providing a system that does not use air to transport the chips or to charge the melt pot.

Moreover, it will be understood that the disclosed system can transport virtually any size or shape of bulk hot melt glue.

Still further, the disclosed system can be almost entirely enclosed, and thus preventing the contamination of the particles with exhaust dust or contaminants in the working environment.

Yet another important aspect of the instant invention is that the disclosed system prevents the contamination of the environment surrounding the system and melt pot with dust or friable components from the transported particles.

The disclosed system does not have any equipment located above the melt pot. Particle delivery equipment located in close proximity to the entrance of the melt pot, such as the actuator mechanism used to open the peel away gate is self cleaning.

Still further, it will be appreciated that the disclosed system can be fitted with an inert gas blanket for particularly demanding applications.

It should also be understood that while the above and other advantages and new, useful results of the present invention will become apparent to those skilled in the art from the following detailed description and accompanying drawings, showing the contemplated novel construction, combinations and elements as herein described, and more particularly defined by the appended claims, it is understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
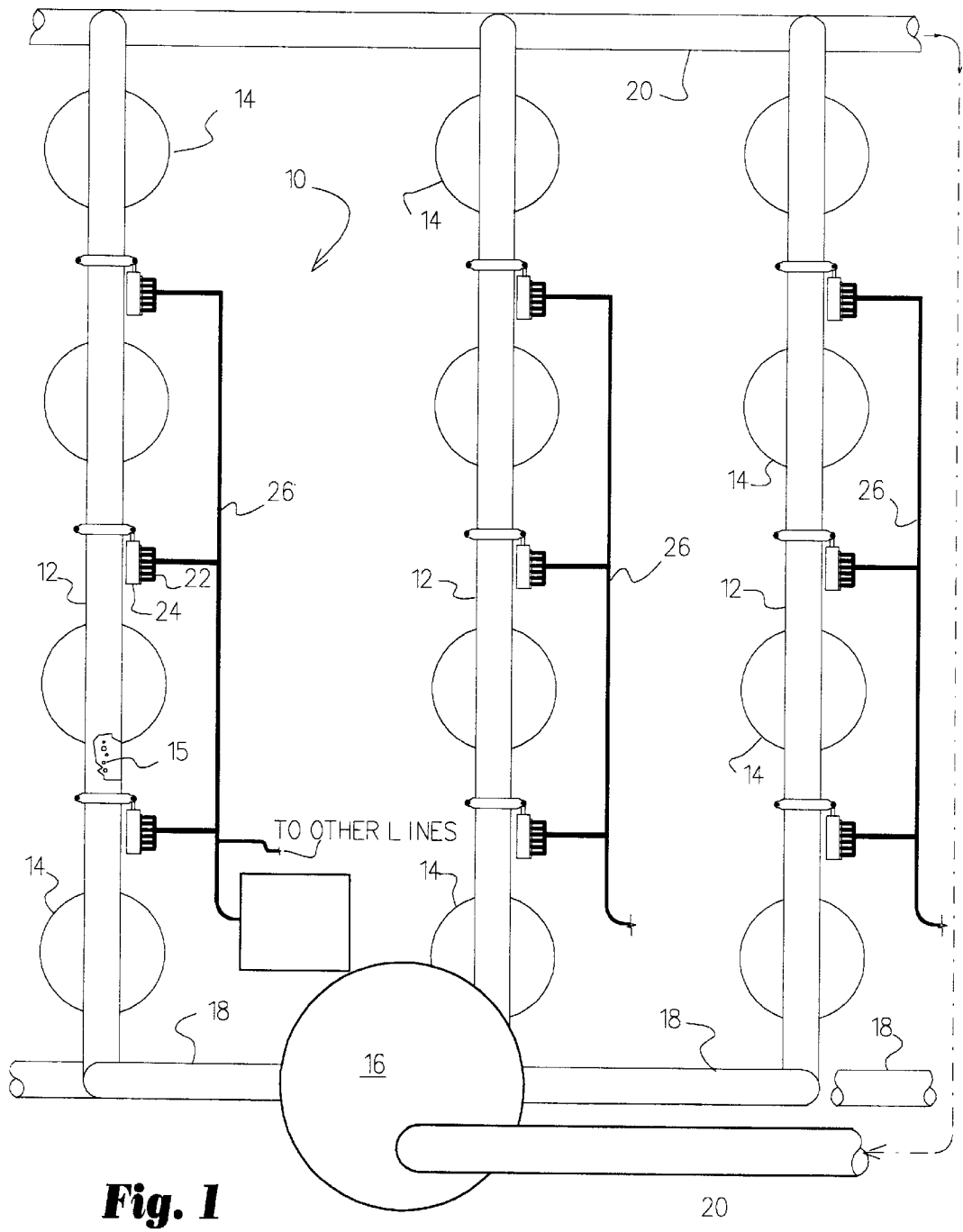
FIG. 1 is a schematic showing an assembly of a plurality of troughs and accelerating mechanisms to deliver material to several melting pots (not shown).

Turning now to FIG. 1, where a bulk materials transport system 10 has been shown, where the system includes an oscillating trough 12, which delivers particulate, bulk material to a series of hoppers 14. The material that is to be carried to the hoppers 14 has been stored in a storage bin 16 or elevator, from where it is distributed to the various troughs 12 by means of distributors 18. The distributors 18 may use any known device for delivering the particulate material to the troughs 12. This includes the use of augers, bucket elevators, cleated belts, and the like. Once the bulk materials have been introduced into the troughs 12, they are re-distributed along the troughs 12 to the points where the bulk material is introduced into the hoppers 14 as needed. The hoppers 14 serve as means for accepting and measuring, or measuring means, for accepting a desired amount of the bulk materials 15 being carried by the system 10. Any excess material which has entered the trough 12 and which is not accepted by the hoppers 14 flows into a return line 20. In a preferred embodiment the return line 20 accepts the overflow material from several troughs 12 and returns the excess material to the storage bin 16. It is important to note that while it is contemplated that rounded troughs or ducts may be used, it is also contemplated that the troughs may be of any suitable shape, as well as have open or closed tops. In making and installing the troughs, one should ensure that at least a portion of the bottom 17 (shown on FIG. 3) of the troughs 12 will be nearly horizontal in the direction of transport.

Figure 2:
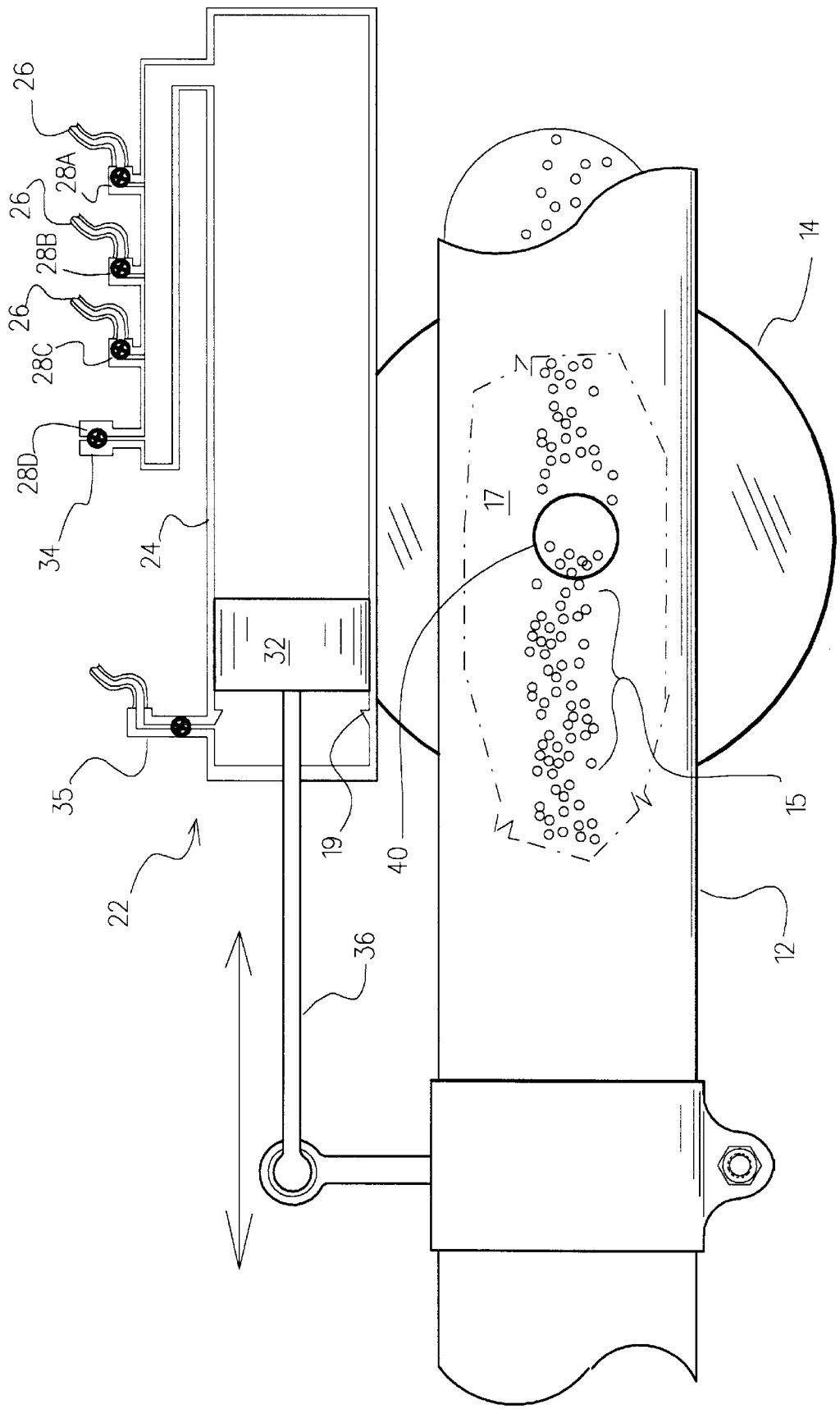
FIG. 2 is a sectional view illustrating the valving and connection of the piston to the trough.

Turning now to FIG. 2, it has been illustrated that the oscillating motion of the troughs 12 is created by means of a pneumatic or gas activated oscillating means 22. A highly preferred embodiment of the oscillating means 22 includes a piston and cylinder 24 which move in response to gas, preferably air, delivered to the oscillating means 22 by means of distribution lines 26.

As shown on FIG. 2 the oscillating means 22 includes a series of valves 28A, 28B, 28C, and 28D which control the delivery of gas from the distribution lines 26 to the cylinder 24. It is important to note that while the disclosed invention has been illustrated using four valves, it is contemplated that the number of valves used can be varied, including the use of a single valve which can be dynamically adjusted to provide increasing pressure and volume.

The valves 28A–28C illustrated are set to deliver gas in progressively increasing pressure and volume. Thus valve 28A opens at a lower pressure than valve 28B, which in-turn opens at a lower pressure than valve 28C, which then opens at a lower pressure than valve 28D. The progressive increase in delivery pressure is designed to provide a graduated increase in acceleration as the piston 32 travels away from valve 28A and towards valve 35, for example. The single direction flow control valve 34 used at the end of the sequence allows the working fluid to escape as the piston 32 is moved back to the starting position. Thus, varying the aperture of the flow control valve 34 one may control the velocity of the piston 32 as it moves along the cylinder 24 on the return stroke. Once the piston 32 has reached the end of its stroke, the piston 32 is driven back to its starting point by means of gas delivered into the cylinder 24 through a return valve 35. The return valve 35 may also incorporate a back pressure regulator to aid in overcoming any static friction (stick slip). In a highly preferred embodiment of the invention a means for rapidly decelerating the motion of the piston 32 will be incorporated into the system. While it is contemplated that these means for rapidly decelerating the piston could be one or more of a wide variety of devices or systems, the preferred embodiment uses a mechanical stop 19 to end or terminate the motion or stroke of the piston 32. Preferably, this stop 19 will preferably produce an abrupt stop or rapid deceleration of the piston 32.

As can be seen in FIG. 2, the piston 32 is connected to a connecting rod 36, which in turn is connected to the trough 12 in order to transmit motive forces from the piston 32 to the trough 12. It is important to note that while it is contemplated that a connecting rod arrangement be used to deliver power from the piston 32 to the trough 12, in order to impart an oscillating motion onto the trough 12, it is also contemplated that other connecting means may be used to deliver the power from the piston 32 onto the trough 12. For example, is contemplated that a pull type connection such as a chain or linkage may be used in place of the connecting rod 36.

Each of the valves 28A through 28D, as well as the single direction flow control valve 34 will preferably controlled by a commercially available programmable logic control (PLC), not shown. The PLC will open the valves in a sequential manner, resulting in higher pressure and working fluid flow to the cylinder with the opening of each additional valve. The gas delivered by the valves will preferably be air, but it is contemplated that any other suitable fluid can also be used. An important aspect in selecting the use of a PLC to control the opening of the valves is that by changing the duration and speed of the sequence of the opening of the valves, one can vary the acceleration of the trough. To achieve motion of the particles in the direction of desired transport of the material, one should first gradually accelerates the trough in the direction of transport. The acceleration must be at a slow enough rate so that the particles do not slip, but accelerate together with the trough. The maximum achievable rate of acceleration, and thus the distance traveled to achieve maximum velocity is determined by the coefficient of friction, weight, other physical characteristics of the material being transported. The acceleration must be carried out at a rate that produces little or no slip between the particles and the trough.

When the peak velocity is reached, the trough 12 should then be rapidly decelerated to a stop. The inertia of the material being carried by the trough 12 will cause the material to continue moving in the direction of the acceleration, and thus slide over the trough 12 in the direction of acceleration. After or at about the time the material being transported comes to rest, the piston should then be returned to its starting point by the introduction of air or the working fluid through the two way valve 35. The return motion should be carried out such that there is no relative motion between the product or particles and the trough 12. Once the trough 12 is returned to the starting position, the acceleration stage of the cycle is commenced once again.

Figure 3:
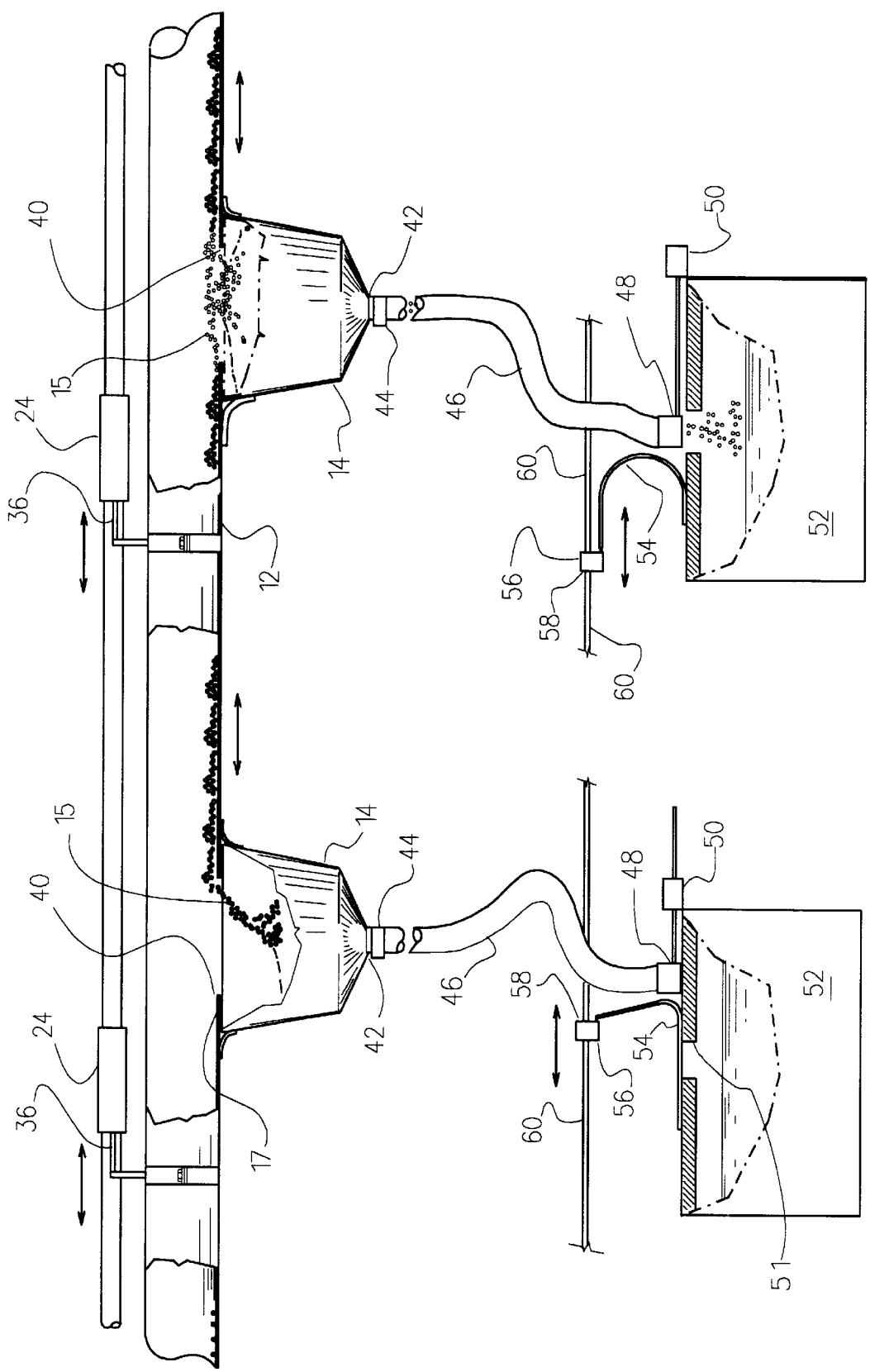
FIG. 3 is a side view of a series of troughs used deliver unmelted glue particles to melting pots.

Also shown on FIGS. 2 and 3 is that the trough 12 will preferably include an opening 40 which serves as an entrance or brim of a means for measuring. In a preferred embodiment of the means for measuring includes the hopper 14 which is mounted immediately below the opening 40. The hopper 14 includes a discharge point 42 which will preferably be controlled by means of a choke valve 44 or other similar means for releasing the contents of the hopper 14. Below the choke valve 44 is mounted a flexible chute 46. The discharge point 48 of the flexible chute 46 is mounted to a means for positioning 50 the discharge point 48 near the entrance 51 of a melting pot 52.

FIG. 3 shows that the discharge point 48 can be moved due to the flexibility of the flexible chute 46. Preferably, the discharge point 48 will be movable from a position away from the entrance 51 of the melting pot 52 to a position directly over the entrance 51 of the melting pot 52. When the discharge point 48 is at a position away from the entrance 51 of the melting pot 52, a cover 54 seals the entrance 51 of the melting pot 52. According to a preferred embodiment of the instant invention, the cover 54 is flexible so as to allow a peel-away opening of the entrance 51 of the melting pot 52. Thus, it will be appreciated that FIG. 3 shows the flexible cover 54 in a closed position at one melting pot and in an open position at another melting pot. The peel away action will preferably be accomplished by means of a linear actuator 56, which in a preferred embodiment includes a magnetically coupled rodless cylinder. These types of actuators include wipers which are mounted on a translator block 58 that rides on a support tube 60. As the translator block slides along the support tube the wipers clean off any contaminants from the support tube 60.

Figure 4:
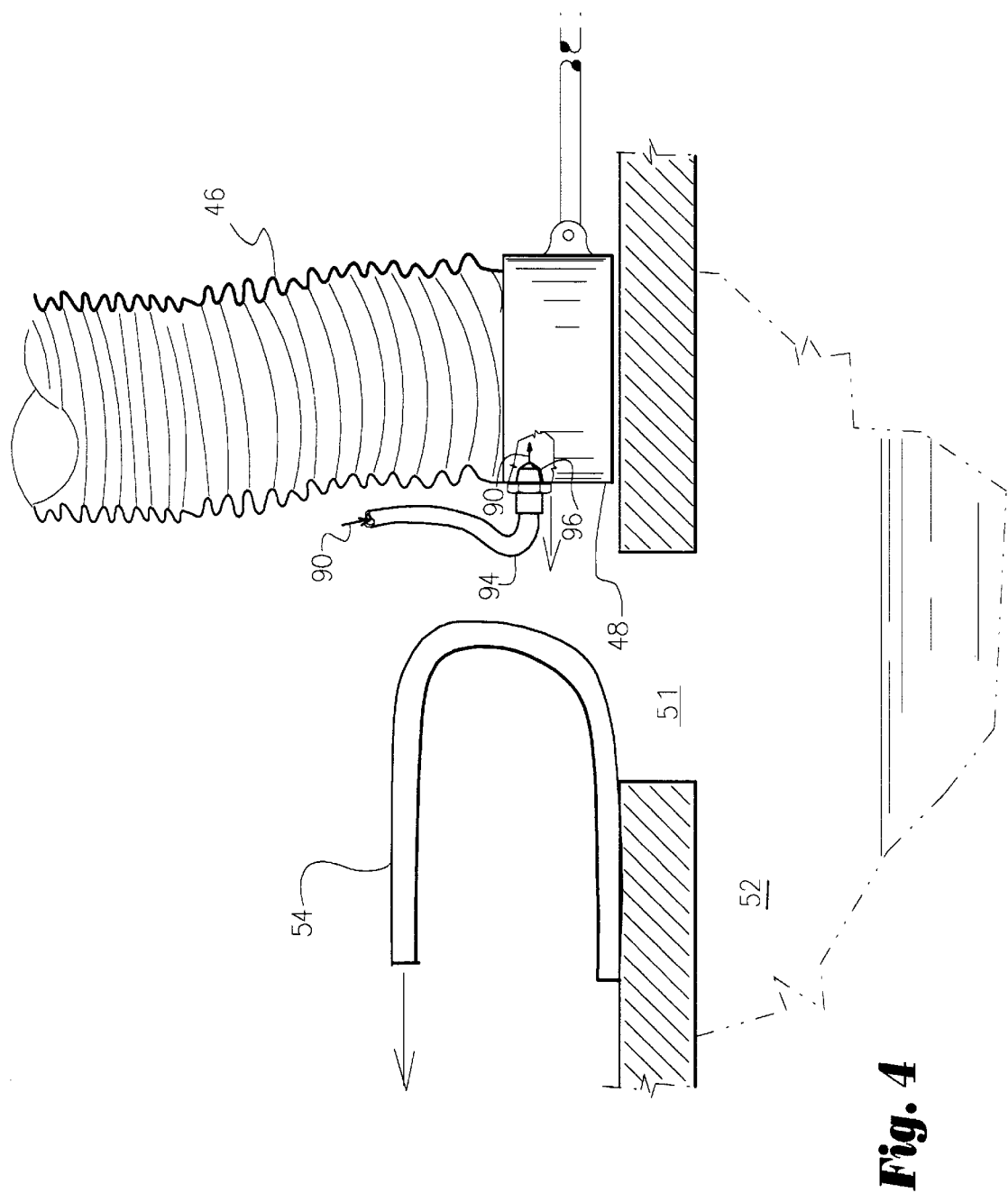
FIG. 4 is a side view of the movable, flexible chute being positioned over the entrance of the melting pot as the cover of the melting pot is being peeled away.

Referring now to FIG. 4, it will be understood that the motion of the discharge point 48 of the flexible chute 46 will preferably be indexed to the position of the cover 54. Thus, as the cover 54 is peeled away to expose the entrance 51 of the melting pot 52, the discharge point 48 of the chute 46 follows the cover 54 as it is positioned directly over the entrance 51 of the melting pot 52.

Once the discharge point 48 of the flexible chute 46 is at the desired position over the entrance 51, the choke valve 44, or other means for releasing the contents of the hopper 14, releases the particles held within the hopper 14, allowing the particles to fall into the melting pot 52. Once the particles have been delivered to the melting pot 52, the choke valve 44 is closed, then the discharge point 48 is moved away from the entrance 51 as the cover 54 is rolled over the entrance 51.

It will be appreciated that the use of a pair of magnetically coupled rodless cylinders to perform the function of the linear actuators 56 will allow the placement of the mechanisms for delivering and sealing the entrance to the melting pot at a position away from any vapors or heat from the melting pot. This arrangement enhances the reliability of the overall system by preventing accumulation of condensates on the actuation mechanisms and the flexible chute 46.

Importantly, will be appreciated that the disclosed invention is particularly useful in situations where plastics which are highly reactive to air are being delivered to the melting pot 52. This is because the peeling away of the cover 54, and the close positioning of the discharge point 48 to the peel away cover 54, as the cover 54 is being peeled away from the entrance 51 of the melting pot 52. The close tracking of the discharge point 48 provides little opportunity for the introduction of significant amounts of air into the melting pot 52. Also, the ability to use the flexible chute 46 together with the hopper 14 to hold and release material at a distance from the entrance 51 of the melting pot 52 prevents the pre-mature heating and melting of material being delivered to the melting pot 52. Additionally, the structure and construction of the discharge point 48 lends itself to the addition of at least one nozzle 96 used to fill the lower end of the discharge tube, or flexible chute 46, with an inert blanketing gas 90 delivered through a duct 94 during the discharge of the particles, effectively excluding air from the particles as they travel into the melt pot 52.

Still further, while it is well-known that a blanket of inert gas may be used advantageously to prevent the reaction of heated materials and the surrounding air, the instant invention reduces the amount of inert gas that needs to be used in order to achieve proper protection of the material being melted. This reduction in the amount of inert gas that is to be used is accomplished by mobilizing in the particles with the oscillating motion described above, and the use of the flexible chute which can closely follow the cover 54 as it is opened, thereby greatly reducing the exposure of the glue material to ambient air. Construction of the entire system is such that, when required, a blanket of gas may be employed from the storage bin 16 through the balance of the system, and thus excluding air from contact with the particles at all times.

Furthermore, it will be appreciated that the disclosed invention allows delivery of particles of various sizes and shapes, without the use of air, augers or the like.

Figure 5:
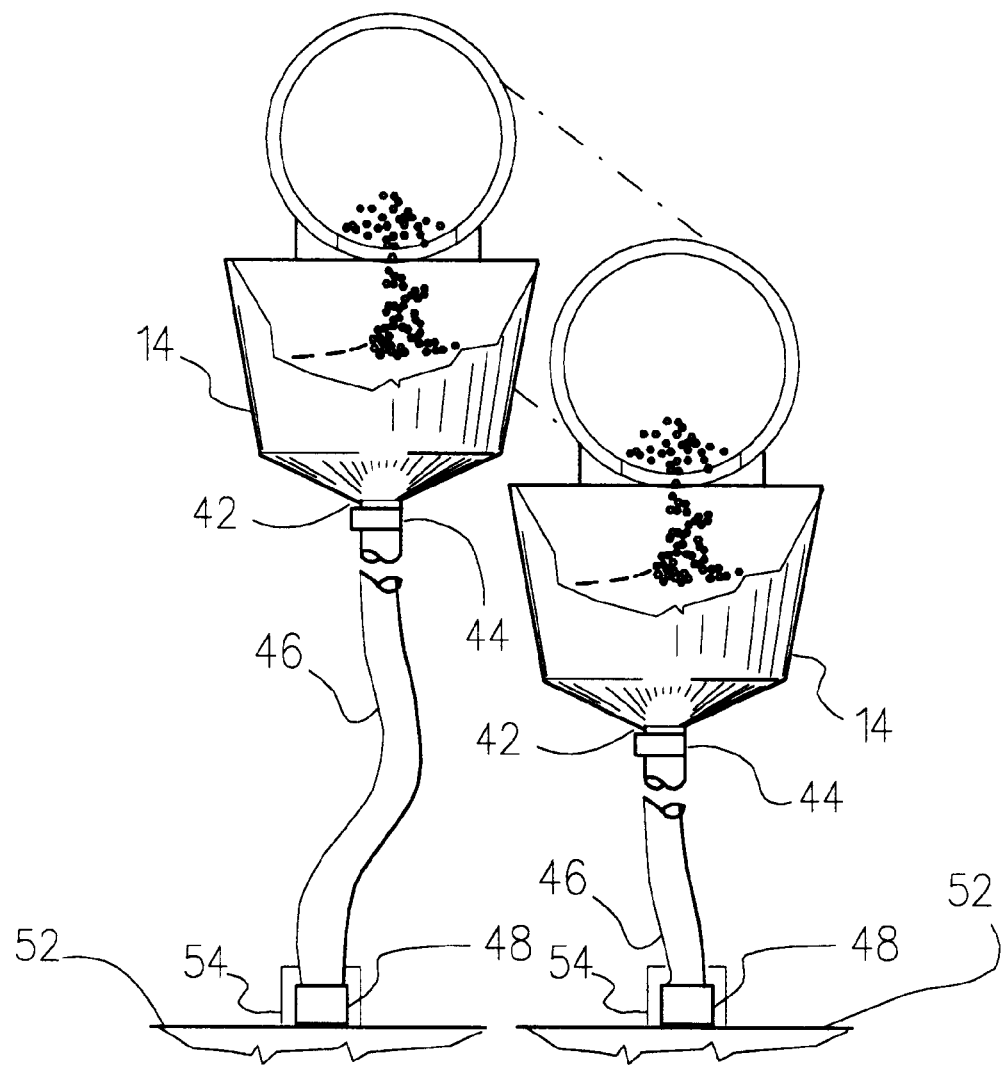
FIG. 5 is an end view of the system as used to deliver material in through troughs that are staggered, or mounted along an angled plane, to improve the usage of the area.

Still further, as shown on FIG. 5, it will be appreciated that the instant invention will allow mounting of the troughs 12 in a staggered manner to reduce the amount of space used by the system.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that the foregoing and other modifications are exemplary only, and that equivalent changes in form and detail may be made without departing from the true spirit and scope of the invention as claimed, except as precluded by the prior art.

What is claimed is:

1. A system for conveying particulates, the system comprising:

a trough adapted for receiving and holding the particulates being conveyed;

means for oscillating said trough, said means for oscillating said trough comprising a piston within a cylinder, and means for delivering a fluid at an increasing rate and or pressure to the cylinder, the piston being connected to said trough so that the fluid delivered to the piston at the gradually increasing rate drives the piston to a desired speed; and means for rapidly decelerating said trough, so that particulates received in said trough may be accelerated to a desired speed by said means for oscillating said trough and then rapidly decelerated so that the momentum gained by said particulates received in said trough as said trough is accelerated allows the particulates to move relative to said trough when the trough is rapidly decelerated.

2. A system for conveying particulates according to claim 1, wherein said means for delivering a fluid to the piston at an increasing rate comprises a series of valves, each valve in the series of valves delivering working fluid at a higher pressure than another valve in the series of valves.

3. A system for conveying particulates according to claim 1, wherein said means for delivering a fluid to the piston at an increasing rate is a programmable logic control and at least one valve, the programmable logic control varying the pressure of the fluid delivered through said at least one valve to said cylinder.

4. A system for conveying particulates according to claim 2, wherein said means for rapidly decelerating said trough comprises a mechanical stop.

5. A system for conveying particulates according to claim 4, and further comprising means for withdrawing a predetermined amount of particulate material from said trough.

6. A system for conveying particulates according to claim 5, wherein said means for withdrawing a predetermined amount of particulate material from said trough comprises a hopper mounted from said trough.

7. A system for conveying particulates according to claim 6, and further comprising a flexible discharge chute extending from said hopper.

8. A system for conveying particulates according to claim 7, and further comprising a peel away cover, the peel away cover being placed near said flexible discharge chute and being adapted for receiving material from said flexible discharge chute.

9. A system for conveying particulates according to claim 8, wherein said flexible chute comprises an entrance end and a discharge point, said discharge point is indexed to motion of said peel away cover, so that motion of said peel away cover is closely followed by motion of the discharge point of said flexible chute.

10. A system for conveying particulates, the system comprising:

a trough adapted for receiving and holding the particulates being conveyed, said trough further having a bottom having at least one permanently open aperture for accepting particulates from said trough;

means for oscillating said trough, said means for oscillating said trough comprising a piston within a cylinder and means for delivering a fluid to the cylinder at an increasing rate, the piston being connected to said trough so that the fluid delivered to the piston at the gradually accelerating rate drives the piston to a desired speed; and means for rapidly decelerating said trough, so that particulates received in said trough may be accelerated to a desired speed by said means for oscillating said trough and then rapidly decelerated so that the momentum gained by said particulates received in said trough as said trough is accelerated allows the particulates to move relative to said trough when the trough is rapidly decelerated.

11. A system for conveying particulates according to claim 10, wherein said means for delivering a fluid to the piston at a gradually increasing rate comprises a series of valves, each valve being actiavateable in a sequence and set to deliver working fluid at a higher pressure the previously activated valve.

12. A system for conveying particulates according to claim 10, wherein said means for delivering a fluid to the piston at a gradually increasing rate is a programmable logic control.

13. A system for conveying particulates according to claim 11, wherein said means for rapidly decelerating said trough comprises a mechanical stop.

14. A system for conveying particulates according to claim 13, and further comprising means for accepting and measuring a desired amount of particulate material from said trough through said opening.

15. A system for conveying particulates according to claim 14, wherein said means for accepting and measuring a desired amount of particulate material from said trough comprises a hopper mounted from said trough and directly below said opening.

16. A system for conveying particulates according to claim 15, and further comprising a flexible chute extending from said hopper and having an entrance end and a discharge point; and a flexible, peel away cover next to the discharge point of said flexible chute, the discharge point of said flexible chute being indexed to the peel away cover, so that motion of said peel away cover is closely followed by motion of the discharge point, allowing placement of the discharge point of said flexible chute at a position directly over a position previously covered by the peel away cover.

17. A method for delivering particulates to a melting pot, the method comprising:

delivering a continuous flow of particulate material to an oscillating trough, the trough having a bottom having at least one permanent aperture;

gradually accelerating the particulate material by moving the trough by means of a piston driven by a fluid delivered to the piston at a gradually increasing rate, the piston being connected to said trough so that the fluid delivered to the piston at the gradually accelerating rate drives the piston together with the trough and material in the trough to a desired speed; and rapidly decelerating the trough, so that particulate material in the trough move relative to said trough due to the speed gained when the trough together with the material was accelerated.

18. A method for conveying particulates according to claim 1, wherein said means for delivering a fluid to the piston at a gradually increasing rate comprises a series of valves, each valve being set to deliver working fluid at a higher rate than the previous valve.

19. A method for conveying particulates according to claim 18, and further comprising delivering a desired amount of particulate material through the permanent aperture in the trough, the desired amount being defined by filling a measuring means placed immediately below the aperture in the trough to a level that is substantially even with the bottom of the trough.

20. A method for conveying particulates according to claim 19, and further comprising:

providing a flexible discharge chute extending from the measuring means, the flexible discharge chute having a discharge point;

providing a flexible, peel away cover over a desired delivery area;

indexing the discharge point of the chute to the position of the peel away cover;

exposing the delivery area by retracting the peel away cover; positioning the discharge point of the chute over the delivery area; and delivering the particulate material to the delivery area from the measuring means, through the chute and discharge point of the chute.

* * * * *